July 6, 1926.
W. E. WILSON ET AL
TUNNEL KILN
Filed April 15, 1921
1,591,599
2 Sheets-Sheet 1
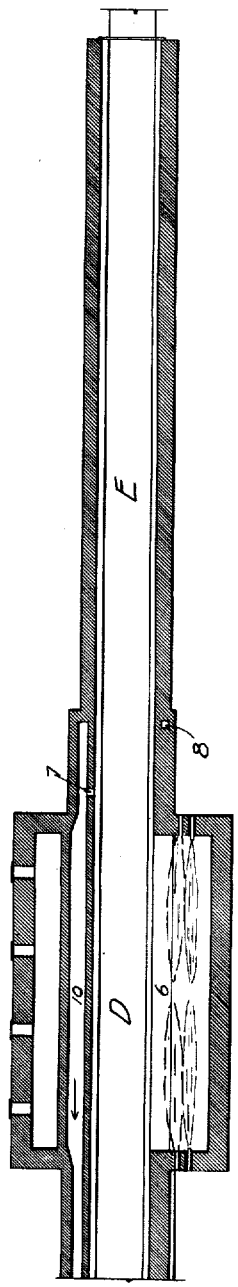
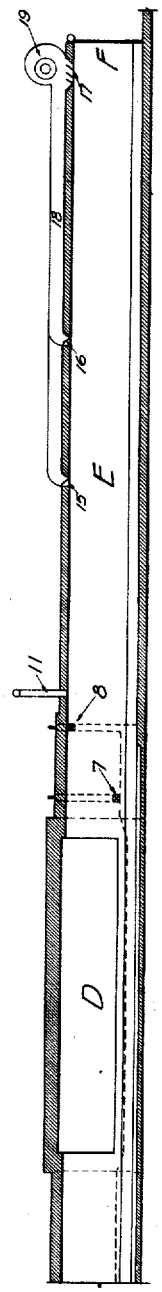
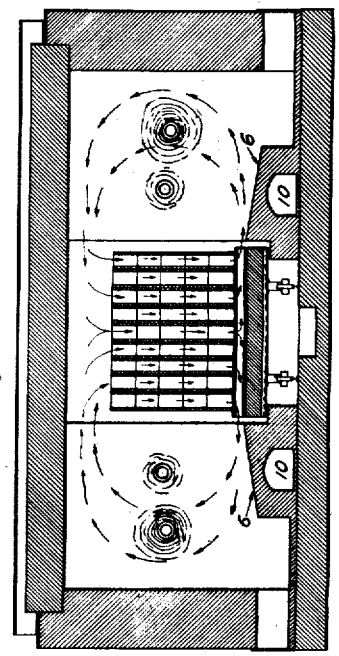
INVENTORS.
William E. Wilson.
Henry G. Lykken.
BY
Wallace R. Lane
ATTORNEY July 6, 1926.
W. E. WILSON ET AL
TUNNEL KILN
Filed April 15, 1921
1,591,599
2 Sheets-Sheet 2
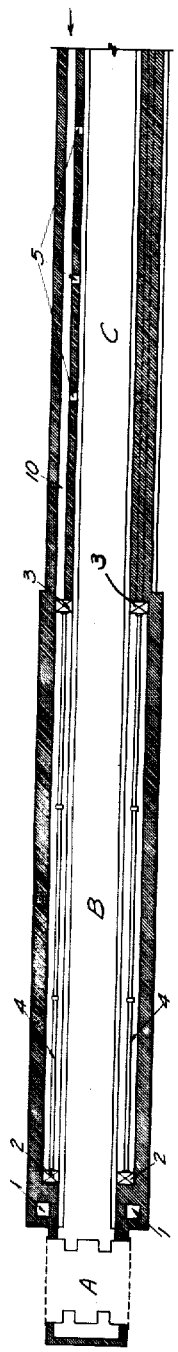
Fig. 1-a
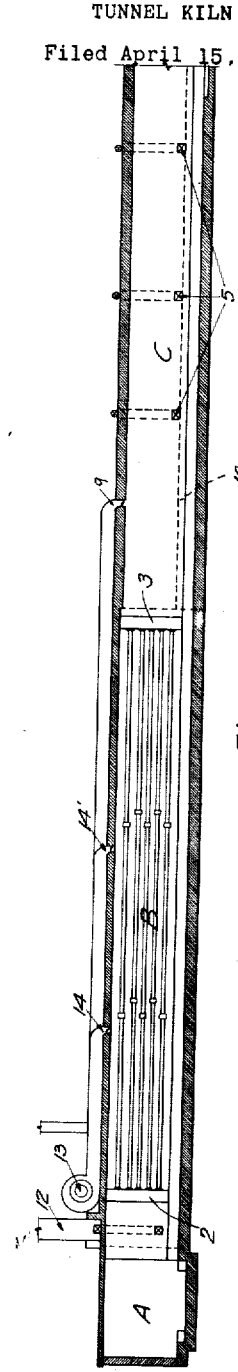
Fig. 2-a
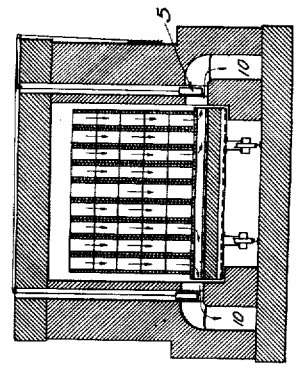
Fig. 4
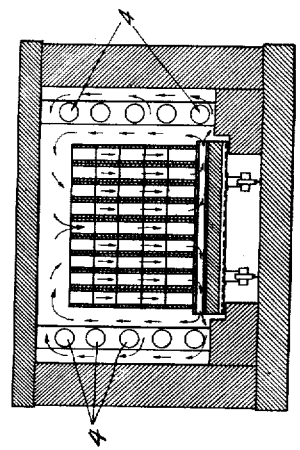
Fig. 3
INVENTOR.
William E. Wilson.
BY Henry G. Lykken.
Wallace R. Lane
ATTORNEY Patented July 6, 1926.

1,591,599

UNITED STATES PATENT OFFICE.

WILLIAM E. WILSON, OF MASON CITY, IOWA, AND HENRY G. LYKKEN, OF MINNEAPOLIS, MINNESOTA.

TUNNEL KILN.

Application filed April 15, 1921. Serial No. 461,594.

The present invention relates to new apparatus for treating plastic ware and comprises among its objects: to construct a new and improved tunnel kiln; to provide in a tunnel kiln means for continuously and successively performing the operations of drying, preheating, burning and cooling the ware under treatment; to provide, in a structure of the character stated, means for withdrawing hot air from the preheating chamber and passing it through the drying chamber for the purpose of drying the ware; to provide, in a structure of the character stated, means for withdrawing air from the burning chamber and passing it into the drying chamber; to provide, in a structure of the character stated, means for withdrawing air from the preheating chamber, passing it through a duct or flue into a radiating means for the purpose of reheating the air and circulating same in the drying chamber; to provide, in a structure of the character stated, means for withdrawing air from the cooling chamber and passing it through a duct or flue into a radiating means for the purpose of reheating the air and circulating same in the drying chamber; to provide, in a structure of the character stated, means for withdrawing air from the cooling chamber and passing it through a duct or flue for use in drying ware in storage other than in any part of the kiln or for any other purpose; to provide means for causing a circulation of air through the ware stacked in the drying chamber; to provide means for drawing hot air from the burning chamber and forcing it into the preheating chamber; and such further objects, advantages and capabilities as will later more fully appear.

Our invention further resides in the combination, construction and arrangement of parts illustrated in the accompanying drawings, and while we have shown therein a preferred embodiment we desire the same to be understood as illustrative only and not as limiting our invention.

In the accompanying drawings:—

Figs. 1ª and 1ᵇ show a sectional plan of a tunnel kiln embodying our invention.

Figs. 2ª and 2ᵇ present a vertical longitudinal section of the construction shown in Figs. 1ª and 1ᵇ.

Fig. 3 is a transverse section of the drying portion B of Figs. 1ª and 2ª.

Fig. 4 is a vertical cross section through the preheating section C.

Fig. 5 is a vertical cross section of the burning chamber D.

Referring more in detail to the drawings annexed hereto and forming a part hereof, A designates the ante-chamber, B the drying chamber, C the preheating chamber, D the burning chamber and E the cooling chamber of a tunnel kiln comprising our invention, while F designates the exit port from which the ware is withdrawn after being burned and cooled. The ante-chamber A receives the cars of ware which are about to be taken into the drying chamber B. Leading from the end of the drying chamber B adjacent to the ante-chamber A is a waste gas exit port or a plurality of such ports, leading to a chimney or other waste gas exhaust means 12, which will create a sufficient suction to withdraw the moisture laden warm air from the section B. Connecting ducts 2 and 3 are arranged in pairs on opposite sides of the drying chamber and are themselves connected by a plurality of heat radiating pipes 4 through which hot gases may be drawn by the fan 13 connected to the ducts 2 as shown in Fig. 2ª. The ducts 3 are connected with ducts 10 located in the walls of the kiln, as shown most clearly in Fig. 4, and the latter ducts have damper controlled openings 5 connecting with the preheating chamber, preferably at substantially the level of the car deck.

The burning section D of our kiln is shown in Fig. 1ᵇ as being provided with oil, gas or powdered fuel burners, or with firing chambers for the use of such fuels as coal and the like. It is of course obvious that either type of heating means may be used on either or both sides of the kiln, but as a matter of fact, it would be preferable in most cases to have the same arrangement on both sides. Located in the chamber D, at the sides of the car tracks, are combined bridge wall and radiating members 6 covering the ducts 10 and protecting the car trucks. Connecting the ducts 10 with the exit end of the chamber D and the inlet end of the chamber E are damper controlled ports 7 and 8 by means of which hot air can be drawn from the chambers D and E into the ducts 10, to be delivered thereby to the members in chamber B. After the hot air and gases have been drawn through the radiating means 4 by the fan 13 they are forced outwardly from the fan through the pipes connected therewith and passed through controllable openings 14, 14' and 9 to be discharged into the drying chamber and the preheating chamber.

From the cooling chamber E extends a take off duct 11, by means of which hot air may be withdrawn from the cooling chamber to be delivered to auxiliary dryers or for any other desired purpose. Cold air taken in by the fan 19 is forced outwardly through the opening 17 and cold air duct 18 to be discharged through controllable ducts 15, 16 and 17 into the cooling chamber E, from which the cool ware is withdrawn through exit port F.

Repeating briefly the operation set forth above, the method of heat treatment is as follows:—

The wet ware is either stacked on cars located in the ante-chamber A or is stacked thereon at some other point and the car is run into this ante-chamber. From here the car is passed into the drying chamber B where a circulation of air takes place as shown in Fig. 3, since the pipes 4 are heated by hot air and gases being drawn therethrough from ducts 10 by fan 13. This heated air rises to the roof of the kiln passes over and down through the ware and out through the car deck. In doing so this air becomes saturated with moisture from the drying ware and ordinarily needs to have a little dry air added thereto in order that the drying operation may be continued. This drying should not, however, take place so rapidly, or in such a dry atmosphere, that a dry shell is formed on the ware. If this were to take pace the surface would be spoiled by checking and spalling, and it is therefore advisable to have the atmosphere surrounding the ware substantially saturated with moisture, slow evaporation from the surface of the ware being depended upon for the drying thereof. The ware which may consist of such articles as building tile, drain tile, terra cotta, bricks, sanitary ware and other similar products is gradually heated to a point where the moisture leaves the surface by evaporation, and since a substantially saturated atmosphere is maintained about the ware the surface is kept moist and open, permitting the moisture inside to escape. The cars may be advanced through the kilns by a hydraulic ram or other suitable means, and gradually pass from the drying chamber into the preheating, burning and cooling chambers as indicated heretofore.

The suction of the chimney, stack, or other exhaust means 12 draws the air and gases from the chamber B and consequently causes a movement of the air and gases in chambers C and D into the next preceding chamber. Thus the warm air and gases from preheating chamber C pass into drying chamber B, while the hot gases from burning chamber D pass into the preheating chamber C to preheat the ware stacked on the cars therein. As indicated above, hot gases and air may be drawn from the burning and preheating chambers and pass through the radiating pipes 4 in the drying chamber, in controllable amounts, to cause the heating of the atmosphere therein to accomplish the drying of the ware in this chamber. These gases in the radiating coils 4 are passed by the fan 13 through the controllable openings 14, 14' and 9 into the chambers B and C to take up the excess moisture and maintain the atmosphere in the first of these chambers just below the point of saturation.

The ware leaving the burning section D enters the cooling section E and there meets the progressively cooler air introduced by the fan 19. By properly controlling the ports 15, 16 and 17 the rate and point of cooling may be varied as required by the particular circumstances, the greatest amount of cooling, however, normally taking place near the exit port F. With some classes of ware it is desirable to lower the temperature rapidly and therefore the cold air is forced through openings 15 and 16, a smaller proportion being admitted through opening 17.

Sometimes flames of excessively high temperature would cause the burning chamber D to be heated too rapidly and to too high a temperature, and in order to prevent this steam jets or water sprays may be admitted in order to keep the temperature down. With a fire box so arranged, it is possible to produce any desired variation in temperature or condition in the products of combustion, such as a reducing or an oxidizing atmosphere. By the introduction of volatilizing substances, it is possible to bring about color and other variations in the products burned.

It is of course understood that the specific description of structure and methods set forth above may be departed from without departing from the spirit of our invention as set forth in this specification and the appended claims.

Having now described our invention, we claim:

1. A tunnel kiln, comprising a series of chambers including a firing chamber and drying cramber, a radiator in the drying chamber, means conducting hot gases from the firing chamber into the radiator, means withdrawing the gases from the radiator and discharging a portion thereof into the interior of the drying chamber.

2. A tunnel kiln comprising a series of chambers including a firing chamber and a drying chamber, a radiator in the drying chamber, means conducting hot gases from the firing chamber into the radiator, means withdrawing the gases from the radiator and discharging a portion thereof into the interior of the drying chamber, and means for withdrawing the mixture of gases from the drying chamber.

3. In a railroad tunnel kiln, drying, preheating, burning and cooling chambers, means whereon ware can be passed successively and progressively through these chambers, means for supplying heat to the burning chamber, means for passing said heat through the preheating and drying chambers in the reverse direction from that travelled by ware, and means including bypass passages for withdrawing part of the heat from the burning chamber and transferring part of this to the drying chamber.

4. In a railroad tunnel kiln, a drying chamber, and a burning chamber, means for passing the products of combustion from the burning chamber to the drying chamber, and means for withdrawing from the burning chamber a part of the products of combustion and passing them in a confined state through radiating members in the drying chamber.

5. In a tunnel kiln, means for drying, preheating and burning plastic ware, means for drawing part of the products of combustion directly from the burning chamber to the drying chamber and utilizing them in radiating members in said chamber, and means for withdrawing the products of combustion from the radiating members and discharging them into the drying space proper.

6. In a tunnel kiln, a drying chamber and a preheating chamber, hollow radiating means in the drying chamber, a suction means connected with one end thereof and having discharges into the drying chamber, and a connection between the radiating means and the preheating chamber whereby atmosphere in the preheating chamber may be withdrawn therefrom and passed through the radiating means.

7. In a railroad kiln, a preheating chamber having controllable means for withdrawing gases near the bottom of a load of ware in the preheating chamber, and means for causing said gases to pass through radiating members in a relatively cooler section of the kiln.

8. In a railroad kiln, a drying and a preheating section, and means for withdrawing gases near the bottom of a load of ware in the preheating section and discharging same into the drying section.

9. In a railroad kiln, two chambers, one having heat radiating means therein and the other constituting a preheating chamber, and means for admitting to the preheating chamber gases from the heat radiating means, in controllable amounts.

10. In a railroad kiln, a preheating section and a relatively cooler section, and means for delivering from the cooler section to the preheating section gases in controllable amounts.

11. In a railroad tunnel kiln, a burning chamber, and a combination radiating house and bridge wall for the protection of car trucks, said burning chamber being devoid of obstructions to the circulation of gases through the ware in said chamber from the combustion space or spaces.

12. In a railroad tunnel kiln, a burning chamber and means for admitting water or water vapor at one or more points to control the temperature of the chamber.

13. In a railroad tunnel kiln, a burning chamber and means connected therewith for preventing overheating of any portion of the ware load by admitting controlled amounts of water or water vapor at the point of excess heat.

14. In a railroad tunnel kiln, a burning chamber provided with means for changing the direction of flow of gases therein and means for the admission of water or water vapor, for the regulation of the gas temperatures in the chamber.

15. In a railroad kiln, means for introducing cooling air into the chamber at different points, and means for controlling the amount of air introduced at each point.

16. In a railroad kiln, a drying chamber and a cooling chamber, radiating members in the drying chamber means connecting the cooling chamber with the radiating means in the drying chamber for transferring heated air from the former to the latter, and means for controlling the rate of transfer.

17. In a railroad kiln, a cooling and drying section, heat radiating means in the drying section, a conduit leading from the cooling section to said radiating means and adapted to transfer the air heated in the cooling section.

18. In a railroad tunnel kiln, drying, preheating, burning and cooling sections, heat radiating members in the drying section, passageways for conveying a part of the gases in the preheating sections to the radiating members in the drying section and means for conveying the gases from the radiating members to the drying chamber.

19. In a railroad tunnel kiln, drying, preheating, burning and cooling sections, means for withdrawing part of the gases from the burning section at a point from the ware exit end thereof and part from the ware entrance end thereof, heat radiating means in the drying section, and means by which a part of the gases in the preheating section may be conveyed to the radiating means in the drying section.

20. In a railroad tunnel kiln, drying, preheating, burning and cooling sections, means for introducing cooling air at one or more points in the length of the cooling section, heat radiating members along the walls of the drying section, means connected at one end with the preheating section at substantially the height of the bottom of a load of ware, and at its opposite end with the heat radiating means in the drying section to transfer heated air from the preheating section to the radiating members, means for controlling the admission of cool air to the cooling section, means for controlling the transference of air from the preheating section to the radiating members, means for discharging the air from the radiating members into the drying and preheating chambers, and means for carrying away from the drying section any excess air therein.

In witness whereof, we hereunto subscribe our names to this specification.

WM. E. WILSON.
HENRY G. LYKKEN.

for withdrawing part of the gases from the burning section at a point from the ware exit end thereof and part from the ware entrance end thereof, heat radiating means in the drying section, and means by which a part of the gases in the preheating section may be conveyed to the radiating means in the drying section.

20. In a railroad tunnel kiln, drying, preheating, burning and cooling sections, means for introducing cooling air at one or more points in the length of the cooling section, heat radiating members along the walls of the drying section, means connected at one end with the preheating section at substantially the height of the bottom of a load of ware, and at its opposite end with the heat radiating means in the drying section to transfer heated air from the preheating section to the radiating members, means for controlling the admission of cool air to the cooling section, means for controlling the transference of air from the preheating section to the radiating members, means for discharging the air from the radiating members into the drying and preheating chambers, and means for carrying away from the drying section any excess air therein.

In witness whereof, we hereunto subscribe our names to this specification.

WM. E. WILSON.
HENRY G. LYKKEN.

Certificate of Correction.

It is hereby certified that in Letters Patent No. 1,591,599, granted July 6, 1926, upon the application of William E. Wilson, of Mason City, Iowa, and Henry G. Lykken, of Minneapolis, Minnesota, for an improvement in " Tunnel Kilns," errors appear in the printed specification requiring correction as follows: Page 2, line 7, before the word "members" insert the word *radiating*, and line 130, claim 1, for the misspelled word " cramber " read *chamber;* and that the said Letters Patent should be read with these corrections therein that the same may conform to the record of the case in the Patent Office.

Signed and sealed this 5th day of October, A. D. 1926.

[SEAL.]

M. J. MOORE,
*Acting Commissioner of Patents.*

Certificate of Correction.

It is hereby certified that in Letters Patent No. 1,591,599, granted July 6, 1926, upon the application of William E. Wilson, of Mason City, Iowa, and Henry G. Lykken, of Minneapolis, Minnesota, for an improvement in "Tunnel Kilns," errors appear in the printed specification requiring correction as follows: Page 2, line 7, before the word "members" insert the word *radiating*, and line 130, claim 1, for the misspelled word "cramber" read *chamber;* and that the said Letters Patent should be read with these corrections therein that the same may conform to the record of the case in the Patent Office.

Signed and sealed this 5th day of October, A. D. 1926.

[SEAL.]
M. J. MOORE,
*Acting Commissioner of Patents.*